(12) United States Patent
McAdoo

(10) Patent No.: US 11,381,065 B2
(45) Date of Patent: Jul. 5, 2022

(54) CABLE LADDER RACK BONDING

(71) Applicant: Belden, Inc, St. Louis, MO (US)

(72) Inventor: Michael Wray McAdoo, Wellsburg, WV (US)

(73) Assignee: BELDEN, INC, St. Louis, MO (US)

( * ) Notice: Subject to any disclaimer, the term of this patent is extended or adjusted under 35 U.S.C. 154(b) by 222 days.

(21) Appl. No.: 16/414,456

(22) Filed: May 16, 2019

(65) Prior Publication Data
US 2019/0356120 A1 Nov. 21, 2019

Related U.S. Application Data

(60) Provisional application No. 62/674,485, filed on May 21, 2018.

(51) Int. Cl.
| | |
|---|---|
| *H02G 3/06* | (2006.01) |
| *H02G 1/00* | (2006.01) |
| *H02G 1/08* | (2006.01) |
| *H02G 3/04* | (2006.01) |

(52) U.S. Cl.
CPC ......... *H02G 3/0608* (2013.01); *H02G 1/005* (2013.01); *H02G 1/08* (2013.01); *H02G 3/0456* (2013.01)

(58) Field of Classification Search
CPC ........ H02G 3/0608; H02G 1/005; H02G 1/08; H02G 3/0456; H02G 3/06; H02G 3/00; H02G 3/02; H02G 3/22; H02G 3/26; H02G 3/285; H02G 3/286; H02G 3/30; H02G 3/36
USPC ... 174/40 CC, 68.1, 40 R, 43, 44, 480, 68.3, 174/72 A, 72 R, 88 R, 70 C; 248/68.1, 248/49, 65; 211/13.1
See application file for complete search history.

(56) References Cited

U.S. PATENT DOCUMENTS

| | | | | |
|---|---|---|---|---|
| 4,232,845 A | * | 11/1980 | Turner | F16L 3/26 174/101 |
| 4,432,519 A | * | 2/1984 | Wright | H02G 3/263 248/49 |
| 4,733,986 A | * | 3/1988 | Kenning | E04B 1/5812 403/306 |
| 5,465,929 A | * | 11/1995 | Dooley | H02G 3/0456 248/68.1 |
| 5,470,021 A | * | 11/1995 | Looney | H02G 3/0608 248/49 |
| 5,580,014 A | * | 12/1996 | Rinderer | H02G 3/0456 174/68.1 |
| 7,546,987 B2 | * | 6/2009 | Sinkoff | H02G 3/0443 248/68.1 |

(Continued)

FOREIGN PATENT DOCUMENTS

JP 2010-094012 A 4/2010

OTHER PUBLICATIONS

First Canadian Exam Report on CA 3043719 dated Apr. 27, 2020 (4 pages).

*Primary Examiner* — Angel R Estrada
(74) *Attorney, Agent, or Firm* — Foley & Lardner LLP

(57) ABSTRACT

The present disclosure describes improved splices for joining ladder rack sections that provide a conductive ground connection, without requiring removal of paint, drilling additional holes, or installation of ground straps between sections. The splices also provide a solid physical connection between ladder rack sections, ensuring safety and stability of the rack system.

20 Claims, 16 Drawing Sheets

(56) References Cited

U.S. PATENT DOCUMENTS

| | | | |
|---|---|---|---|
| 8,167,250 B2* | 5/2012 | White | H02G 3/0608 |
| | | | 248/49 |
| 8,459,604 B2* | 6/2013 | Smith | F16L 3/00 |
| | | | 248/300 |
| 8,573,409 B2* | 11/2013 | White | H02G 3/0608 |
| | | | 248/65 |
| 9,209,609 B2* | 12/2015 | Kellerman | E04B 1/5812 |
| 2010/0044524 A1* | 2/2010 | Sugaya | F16B 33/002 |
| | | | 248/49 |
| 2010/0086348 A1* | 4/2010 | Funahashi | H02G 3/0608 |
| | | | 403/306 |
| 2019/0089141 A1* | 3/2019 | Combes | H02G 3/0608 |

* cited by examiner

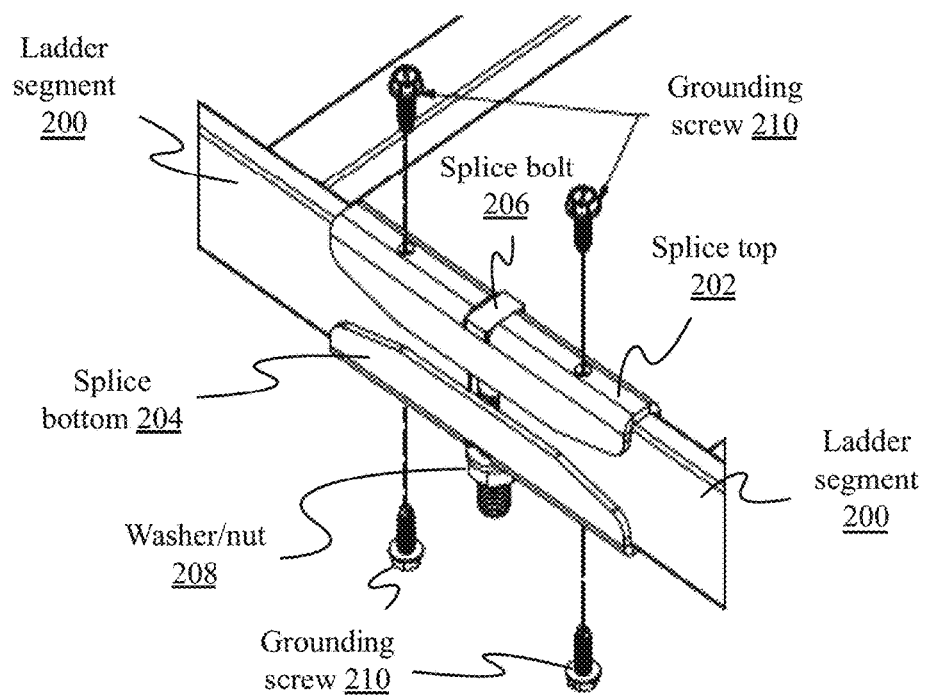
FIG. 2A
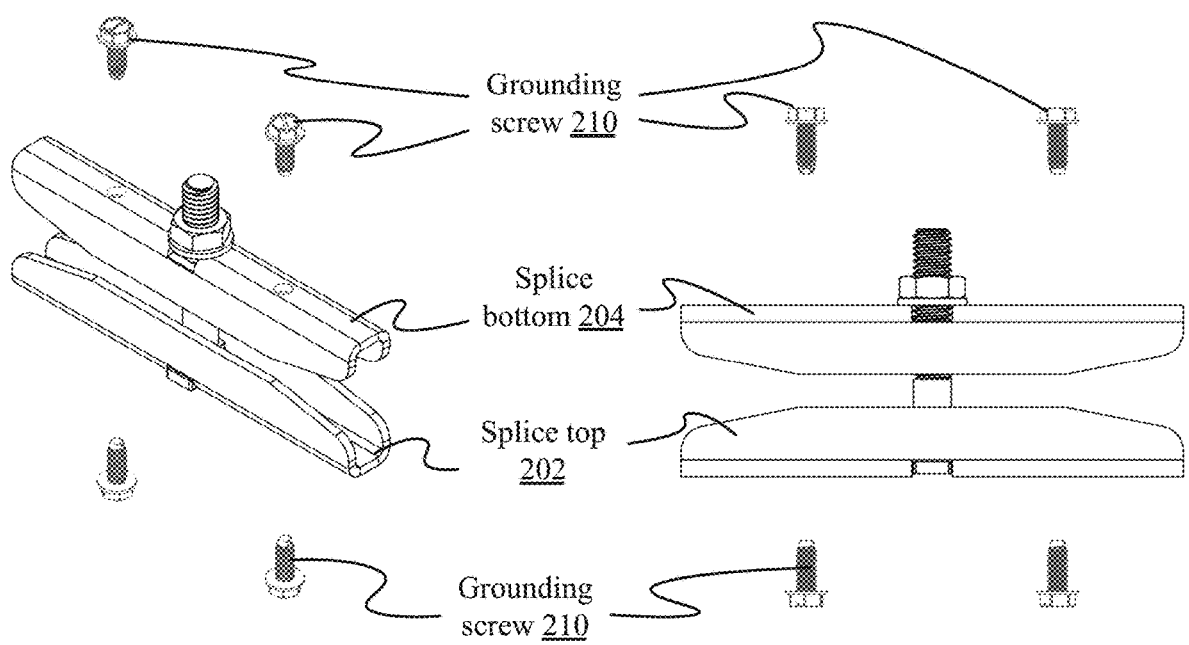
FIG. 2B  FIG. 2C

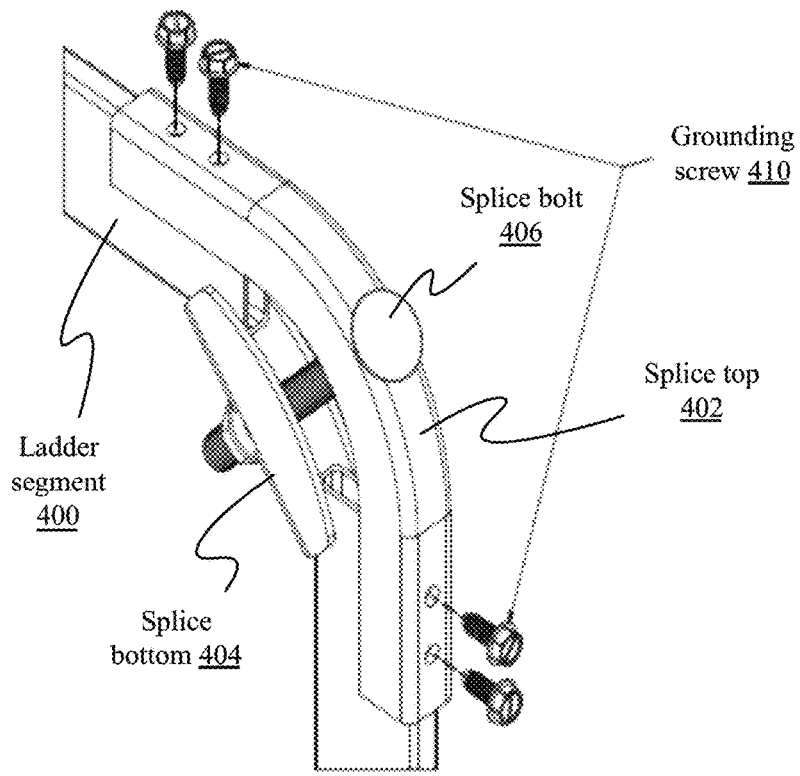
*FIG. 4A*
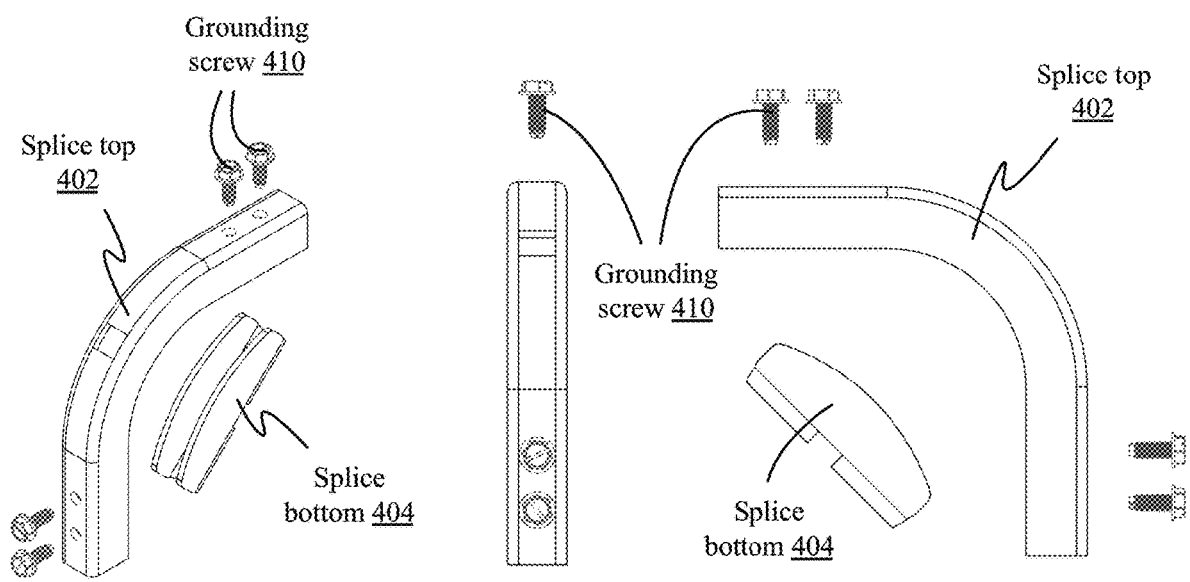
*FIG. 4B*  *FIG. 4C*  *FIG. 4D*

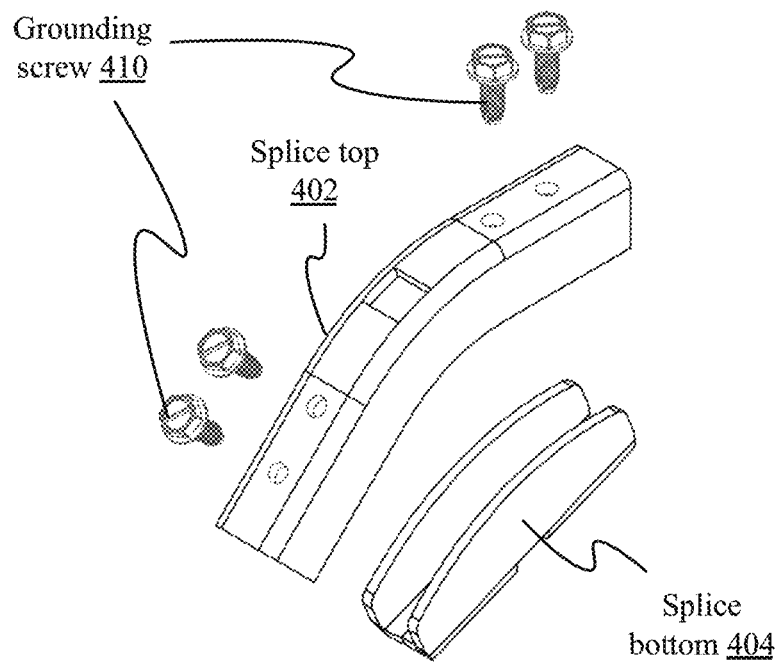
FIG. 4E
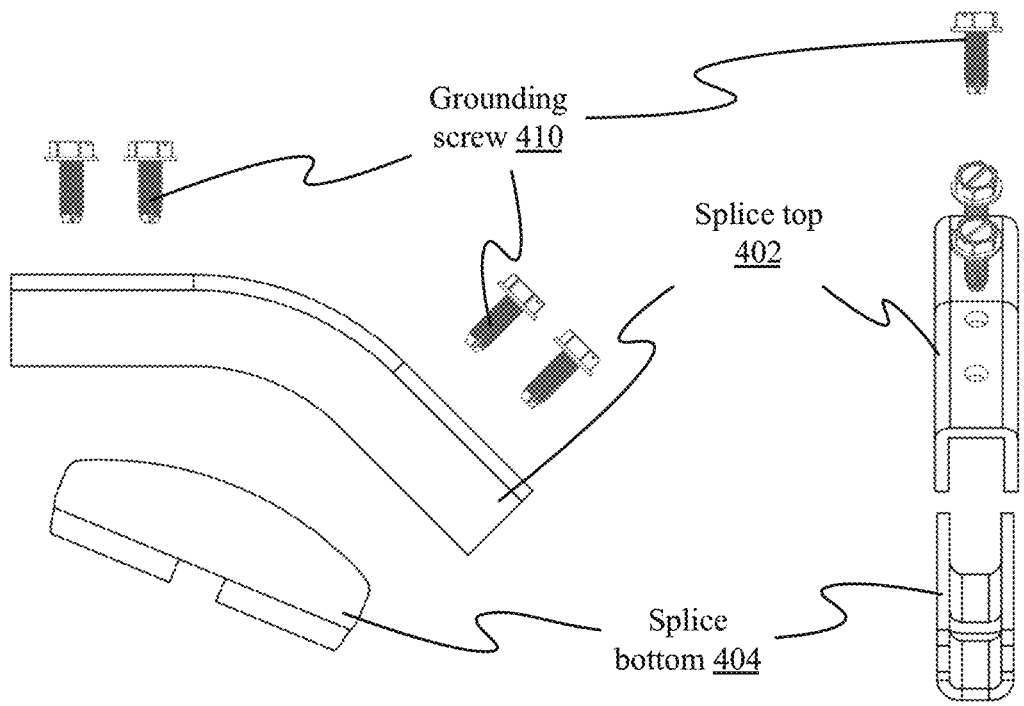
FIG. 4F
FIG. 4G

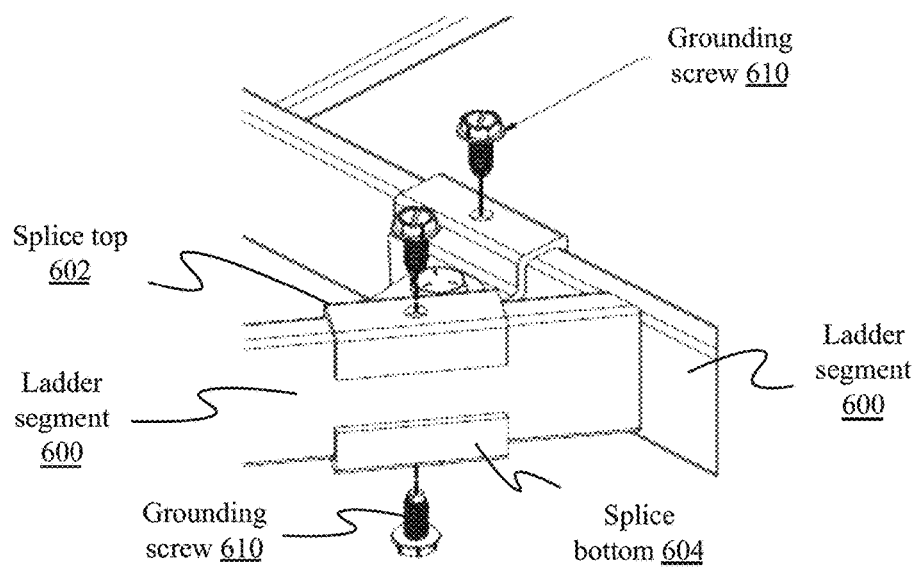
*FIG. 6A*
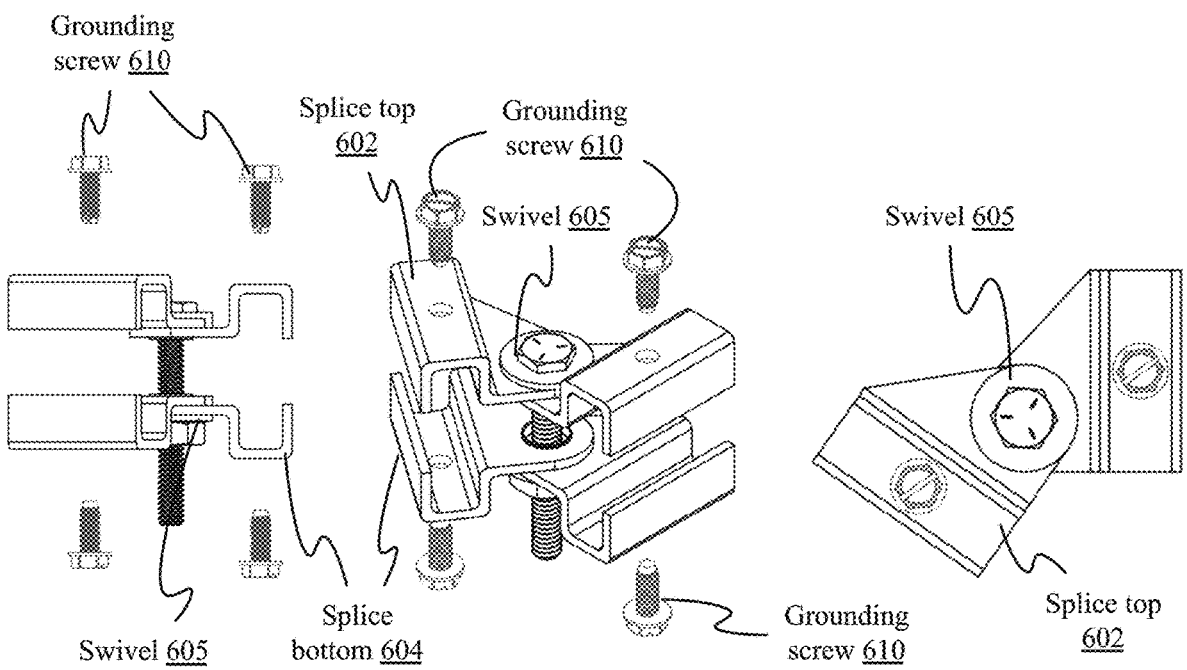
*FIG. 6B*  *FIG. 6C*  *FIG. 6D*

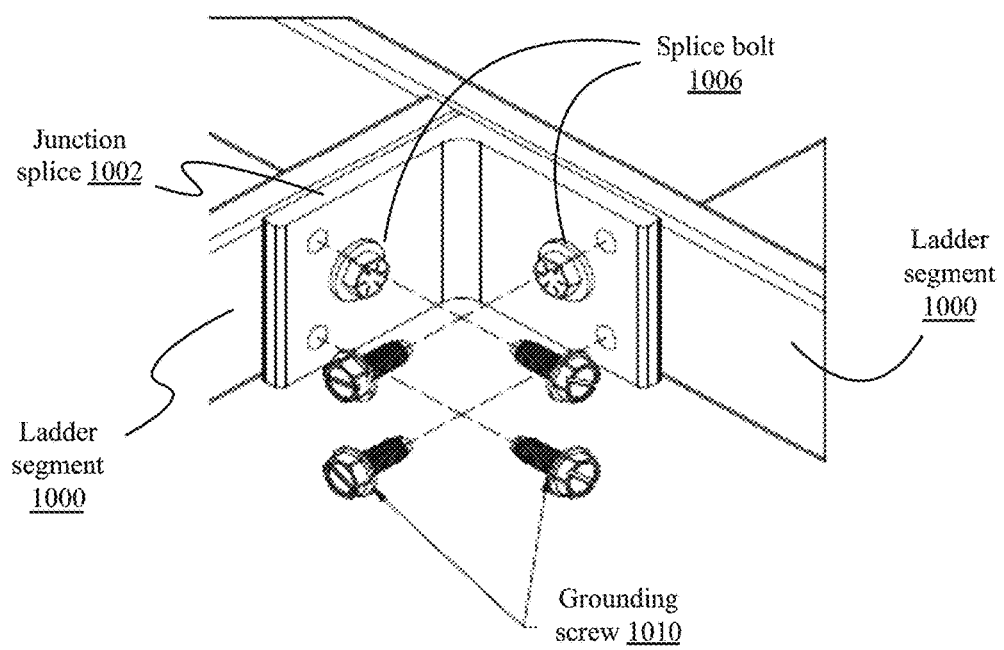
*FIG. 10A*
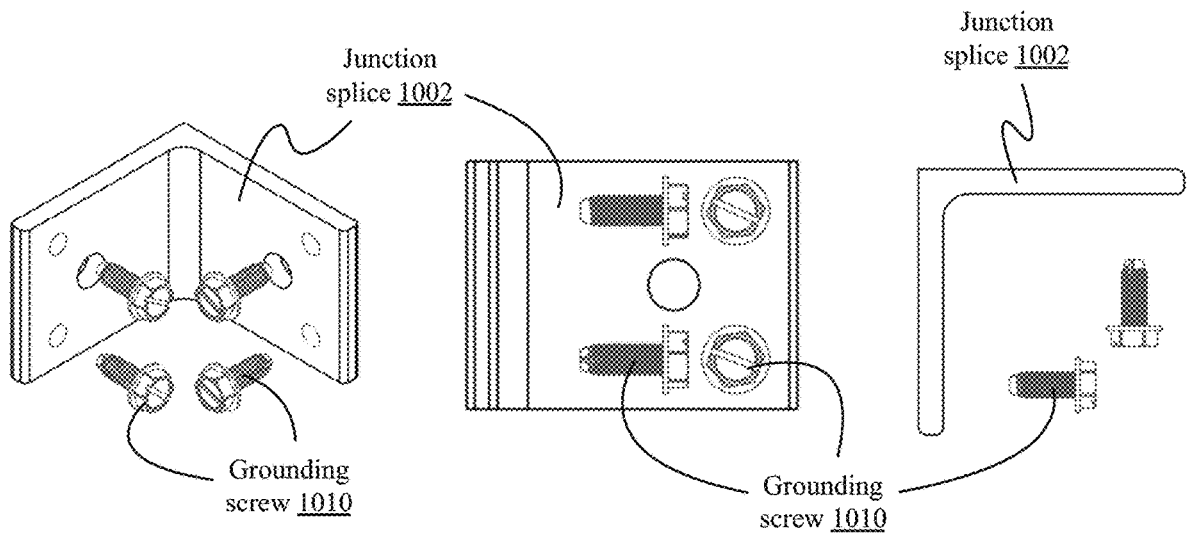
*FIG. 10B*  *FIG. 10C*  *FIG. 10D*

CABLE LADDER RACK BONDING

RELATED APPLICATIONS

The present application claims the benefit of and priority to U.S. Provisional Application No. 62/674,485, entitled "Cable Ladder Rack Bonding," filed May 21, 2018, the entirety of which is incorporated by reference herein.

FIELD

The present application relates to organization and deployment systems for wire and cable. In particular, the present application relates to a system for conductive bonding of cable ladder rack sections.

BACKGROUND

Cable and wire, and particularly data communications cables, are frequently deployed in an environment across open metal frames, frequently referred to as ladder racks, cable ladders, cable trays, ladder trays, or by similar names. These ladder racks may be suspended from a ceiling and/or positioned above equipment racks. Ladder racks allow for easy deployment of cables between equipment racks or throughout a building or data center, safely supporting the cables away from foot traffic and/or above drop ceilings, without requiring cable ties or other attachments. Cables may be easily added and removed from ladder racks, providing easy maintenance of wiring.

Ladder racks are frequently made of conductive materials, such as aluminum or galvanized steel. In typical deployments, ladder racks may be deployed over significant distances, and may be prone to receiving radiofrequency interference or other signals. Accordingly, it may be necessary to connect the ladder racks to an electrical ground to reduce electrostatic interference and induced magnetic currents that may cause noise in communications cables. Additionally, in some implementations, ladder racks may be used to provide electrical grounding for other equipment. Furthermore, grounding of ladder racks may be important for equipment safety by providing a path to ground for any fault currents.

Because ladder racks are provided in discrete sections, they must be joined or bonded in a secure and electrically conductive manner. Typical bonding systems require multiple steps, including removal of paint, drilling of additional holes and attachment of grounding straps, etc. These steps may be tedious or complex, and potentially dangerous, as many installations require the ladder racks to be deployed high in the air with installers working 30 feet or more above the ground.

SUMMARY

The present disclosure describes improved splices for joining ladder rack sections that provide a conductive ground connection, without requiring removal of paint, drilling additional holes, or installation of ground straps between sections. The splices also provide a solid physical connection between ladder rack sections, ensuring safety and stability of the rack system.

In one aspect, the present disclosure is directed to a ladder rack splice. The ladder rack splice includes a first portion for attachment to a first ladder rack segment; and a second portion for attachment to a second ladder rack segment, joined to the first portion, each of the first portion and second portion including at least one screw hole. The ladder rack splice also includes a plurality of conductive screws comprising a cutting portion and a threaded portion, the conductive screws configured to join the first portion or second portion to the corresponding first or second ladder rack segment via a corresponding screw hole in the first portion or second portion of the ladder rack splice.

In some implementations, the first portion and second portion are symmetrical. In some implementations, the first portion and second portion are portions of a unitary body. In a further implementation, the first portion and second portion are arranged linearly along the unitary body. In some implementations, the first portion and second portion are joined by a swivel having one degree of freedom.

In some implementations, the ladder rack splice includes at least one bolt hole within a corresponding at least one of the first portion, the second portion, and a third portion between the first portion and second portion; and a corresponding at least one bolt for affixing the ladder rack splice to a ladder rack segment. In a further implementation, each of the first portion and second portion comprises at least one bolt hole.

In some implementations, each of the first portion and second portion comprises a support tab; and the screw hole in the first portion or second portion of the ladder rack splice is positioned within the corresponding support tab.

In some implementations, each of the first portion and second portion comprise a conductive metal. In a further implementation, each of the first portion and second portion comprise zinc anodized steel, painted steel, or aluminum.

In another aspect, the present disclosure is directed to a ladder rack splice system. The system includes a first ladder rack splice comprising a plurality of screw holes; a second ladder rack splice; and a bolt configured to join the first ladder rack splice and second ladder rack splice around a first ladder rack segment and a second ladder rack segment. The first ladder rack splice comprises a plurality of conductive screws comprising a cutting portion and a threaded portion, each conductive screws configured to join the first ladder rack splice via a corresponding screw hole in the first ladder rack splice to one of the first ladder rack segment or the second ladder rack segment.

In some implementations, the first ladder rack splice and the second ladder rack splice are identical. In some implementations, at least one of the first ladder rack splice and the second ladder rack splice comprises a swivel having one degree of freedom. In some implementations, the first ladder rack comprises a splice end in a first plane and the second ladder rack comprises a splice end in a second plane orthogonal to the first plane. In some implementations, the ladder rack splice system comprises one of a butt splice, a ninety-degree splice, a forty-five degree splice, or a junction splice. In some implementations, the ladder rack splice system comprises an adjustable butt swivel splice, an adjustable junction swivel splice, or an adjustable vertical swivel splice. In some implementations, each of the first ladder rack splice and the second ladder rack splice comprise a conductive metal. In some implementations, each of the first ladder rack splice and the second ladder rack splice comprise zinc anodized steel, painted steel, or aluminum.

In another aspect, the present disclosure is directed to a method for installing a ladder rack splice. The method includes positioning a ladder rack splice around a first ladder rack segment and a second ladder rack segment, the ladder rack splice comprising a first portion for attachment to the first ladder rack segment and a second portion for attachment to the second ladder rack segment; and inserting a plurality of conductive screws through the ladder rack splice and each of the first ladder rack segment and the second ladder rack segment, each of the plurality of conductive screws comprising a cutting portion and a threaded portion, the conductive screws configured to join the first portion to the first ladder rack segment and the second portion to the second ladder rack segment.

In some implementations, the method includes positioning a splice top at a first position, positioning a splice bottom at a second position opposed to the first position across the ladder rack segments, and joining the splice top and splice bottom via a splice bolt. In some implementations, the method includes setting an adjustable swivel of the ladder rack splice according to an angle formed by the first ladder rack segment and the second ladder rack segment.

Optional features of one aspect may be combined with any other aspect.

BRIEF DESCRIPTION OF THE FIGURES

FIGS. 2A-2E are illustrations of an implementation of a conductive ladder rack butt splice;

FIGS. 4A-4D are illustrations of an implementation of a conductive ladder rack 90-degree splice;

FIGS. 4E-4G are illustrations of an implementation of a conductive ladder rack 45-degree splice;

FIGS. 6A-6D are illustrations of an implementation of a conductive ladder rack adjustable junction swivel splice;

FIGS. 10A-10D are illustrations of an implementation of a conductive heavy duty junction splice for ladder racks.

In the drawings, like reference numbers generally indicate identical, functionally similar, and/or structurally similar elements.

DETAILED DESCRIPTION

Cable and wire, and particularly data communications cables, are frequently deployed in an environment across open metal frames, frequently referred to as ladder racks, cable ladders, cable trays, ladder trays, or by similar names. These ladder racks may be suspended from a ceiling and/or positioned above equipment racks. Ladder racks allow for easy deployment of cables between equipment racks or throughout a building or data center, safely supporting the cables away from foot traffic and/or above drop ceilings, without requiring cable ties or other attachments. Cables may be easily added and removed from ladder racks, providing easy maintenance of wiring.

Ladder racks are frequently made of conductive materials, such as aluminum or galvanized steel. In typical deployments, ladder racks may be deployed over significant distances, and may be prone to receiving radiofrequency interference or other signals. Accordingly, it may be necessary to connect the ladder racks to an electrical ground to reduce electrostatic interference and induced magnetic currents that may cause noise in communications cables. Additionally, in some implementations, ladder racks may be used to provide electrical grounding for other equipment. Furthermore, grounding of ladder racks may be important for equipment safety by providing a path to ground for any fault currents.

Figure 1A:
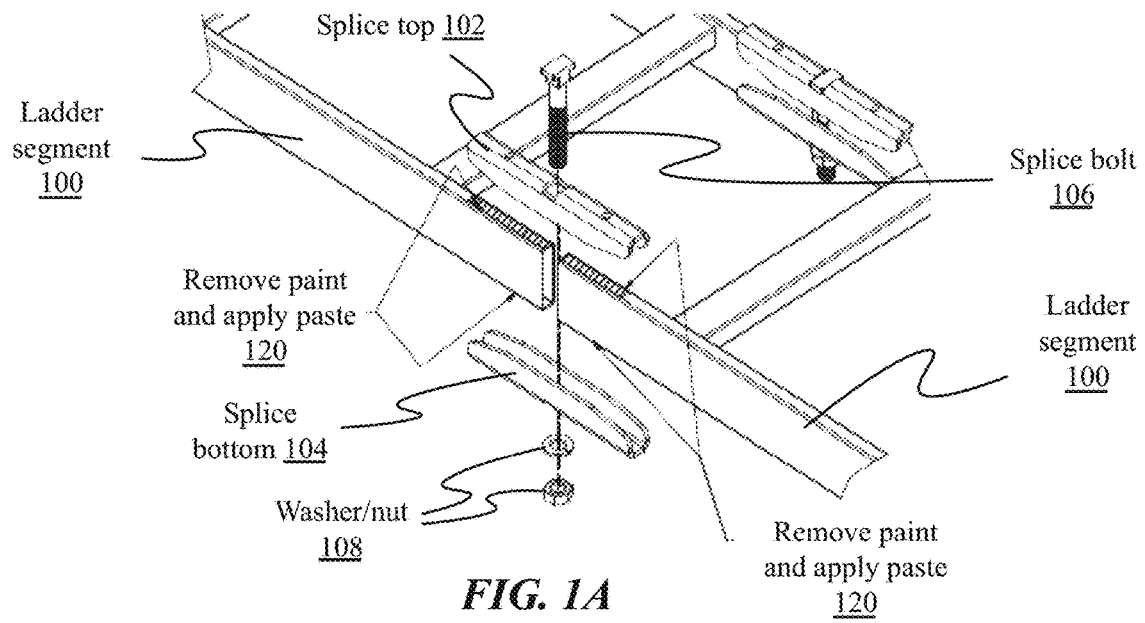
FIGS. 1A-1D are illustrations of ladder rack splices and installation methods, according to some implementations.

Because ladder racks are provided in discrete sections, they must be joined or bonded in a secure and electrically conductive manner. Typical bonding systems require multiple steps, including removal of paint, drilling of additional holes and attachment of grounding straps, etc. For example, FIG. 1A is an illustration of installation of a ladder rack butt splice, according to some implementations. As shown, two ladder rack segments 100 are placed end-to-end. A butt splice, comprising a splice top 102 and a splice bottom 104 are positioned on the top and bottom of a terminal portion of the two ladder segments, and joined with a splice bolt 106 and a washer (typically a lock washer) and nut 108. However, in many implementations, ladder racks are painted or anodized in black zinc to protect against rust. The paint or zinc may not be conductive, and thus, before placing the splice, the installer must first remove the paint or zinc from the top and bottom of each terminal portion of the ladder rack segments 100 and apply an electrically conductive paste as shown at step 120. The paste may be an antioxidant paste, providing protection against rust or corrosion. Removing the paint or zinc may be difficult and may require filing or sanding portions of the rack, potentially while atop a ladder high above the ground, making the operation significantly dangerous.

Figure 1B:
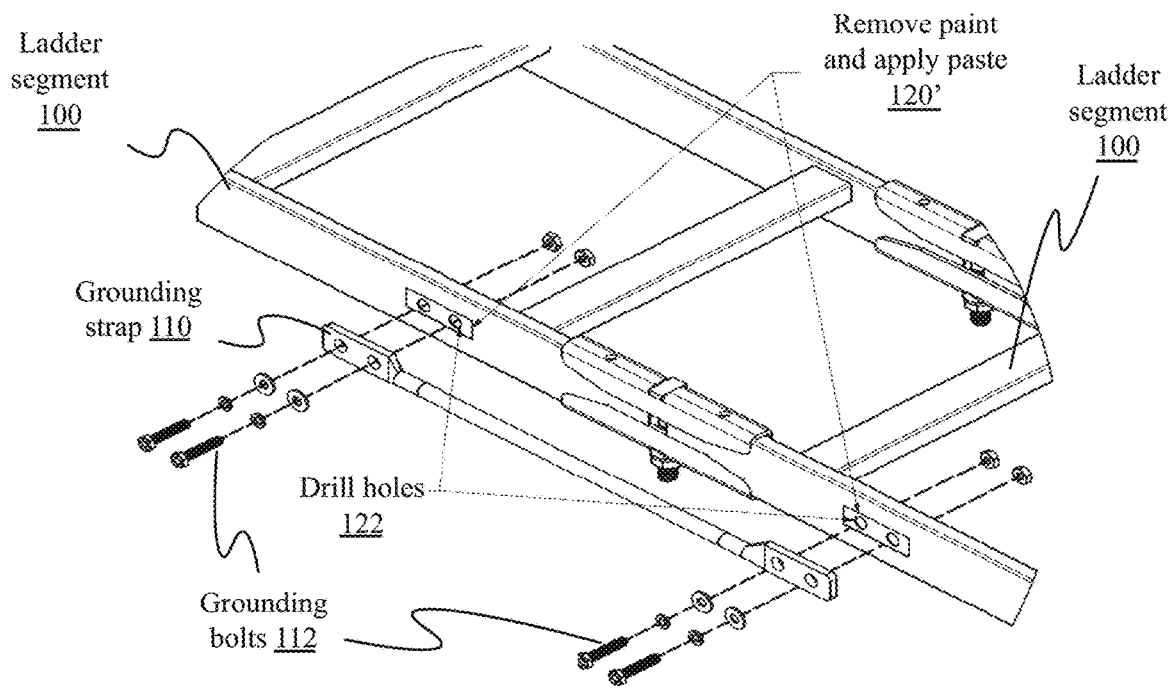

In some implementations, as illustrated in FIG. 1B, a conductive grounding strap 110 (e.g. a large gage copper wire, in many implementations) may be utilized to ensure a proper ground connection between the ladder rack segments 100. The splice may also be applied to provide structural support and stability. While grounding straps may provide better electrical connections, they require several additional steps for installation: the installer must still remove paint or zinc from a portion of each ladder rack segment as shown at step 120'. The installer must also drill holes for grounding bolts 112 to attach the grounding strap 110, as ladder rack segments may not be pre-drilled.

Figure 1C:
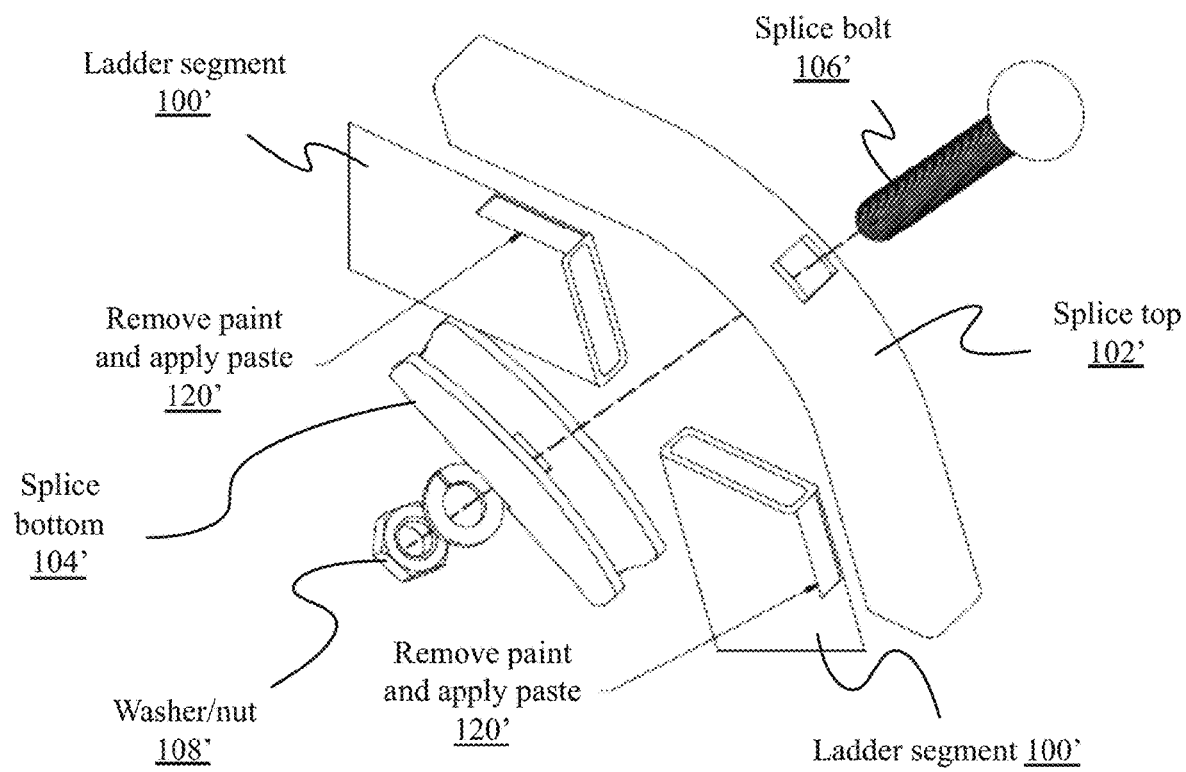
Figure 1D:
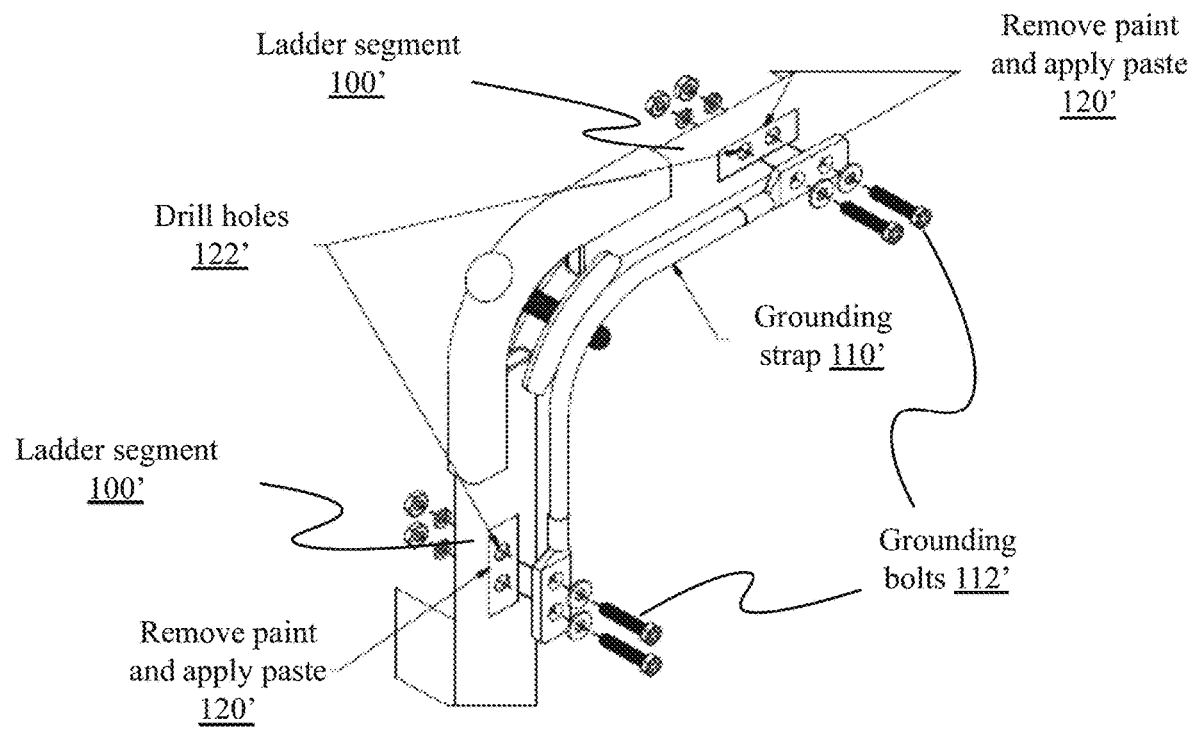

Ladder rack segments 100 may also be joined in other orientations, to provide cable routing around corners, up or down stairs, etc. FIGS. 1C and 1D are illustrations of 90-degree ladder rack splices to join a first ladder rack segment 100' in a first plane (e.g. horizontal) to a second ladder rack segment 100' in a second plane (e.g. vertical). Similar to the butt splices discussed above, a splice top 102' may be attached to a splice bottom 104' via a splice bolt 106' and lock washer and nut 108'. As shown in FIG. 1C, the installer may be required to remove paint from the terminal portion of each ladder segment and apply a conductive antioxidant paste at step 120'. Alternately or in addition, as shown in FIG. 1D, the installer may be required to drill holes at step 122' in each ladder rack 100', remove paint and apply the conductive paste at step 120', and attach the grounding strap 110' with grounding bolts 112'.

The splices and installation methods disclosed herein avoid these additional steps while still providing electrical connections between ladder segments, without requiring removal of paint, drilling additional holes, or installation of ground straps between sections. The splices still provide a solid physical connection between ladder rack sections, ensuring safety and stability of the rack system.

Figures 2D, 2E:
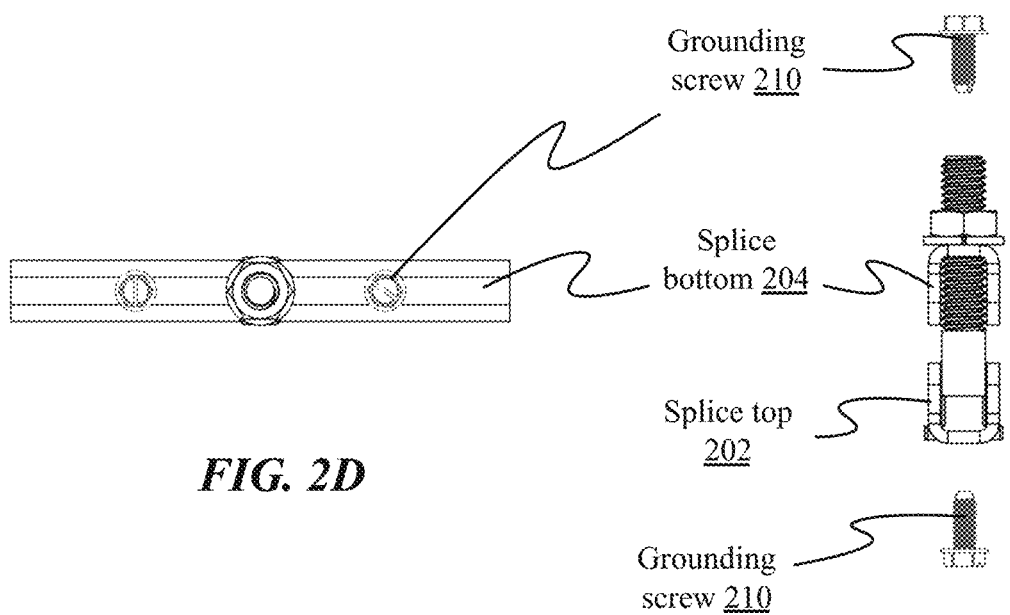

FIGS. 2A-2E are illustrations of an implementation of an improved conductive ladder rack butt splice. As shown in FIG. 2A, each splice may comprise a splice top 202 and a splice bottom 204. In some implementations, the splice top and bottom may be identical and interchangeable, while in other implementations, the splice top may have a different profile or may include additional features. For example, in some implementations, as shown, the splice top and bottom may include a rectangular notch for retaining a rectangular head of a splice bolt 206. The rectangular notch on the splice bottom may be too small to interfere with use of a lock washer and nut 208, and accordingly, the splice top and bottom may be identical. In other implementations, the splice top may include a notch having a different profile, such as hexagonal, to hold a corresponding hexagonal head of a bolt 206. As this may interfere with installation of the washer and nut, in such implementations, the splice bottom may simply have a round hole with a diameter slightly larger than the bolt 206.

As shown, in many implementations, splice top 202 and splice bottom 204 may have a U-shaped profile to match the corresponding profile of a ladder rack segment 200. In many implementations, splice top 202 and splice bottom 204 may be of similar materials to the ladder rack segment 200, such as zinc anodized steel, painted steel, aluminum, etc.

FIGS. 2B and 2C are isometric and side illustrations, respectively, of an implementation of a conductive ladder rack butt splice; and FIG. 2D are bottom and end illustrations of the implementation of a conductive ladder rack butt splice.

Figure 11A:
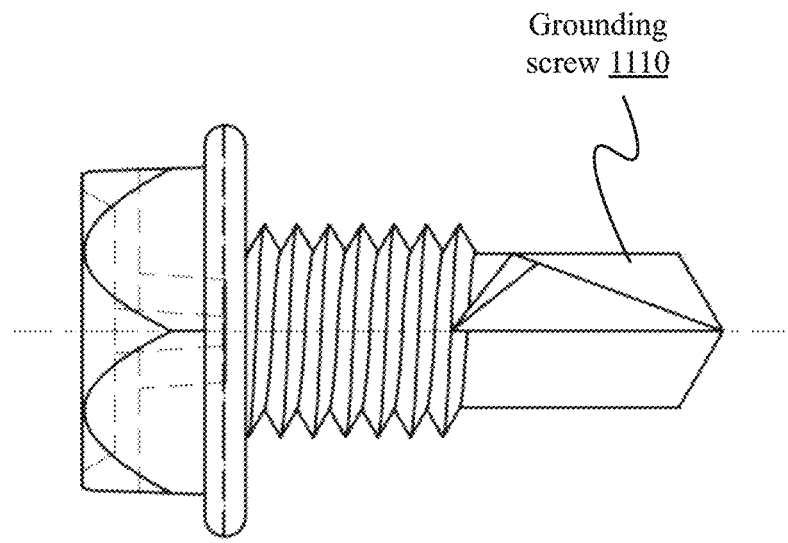
FIGS. 11A-11B are illustrations of a self-tapping electrically conductive grounding screw for use with conductive splices for ladder racks.
Figure 11B:
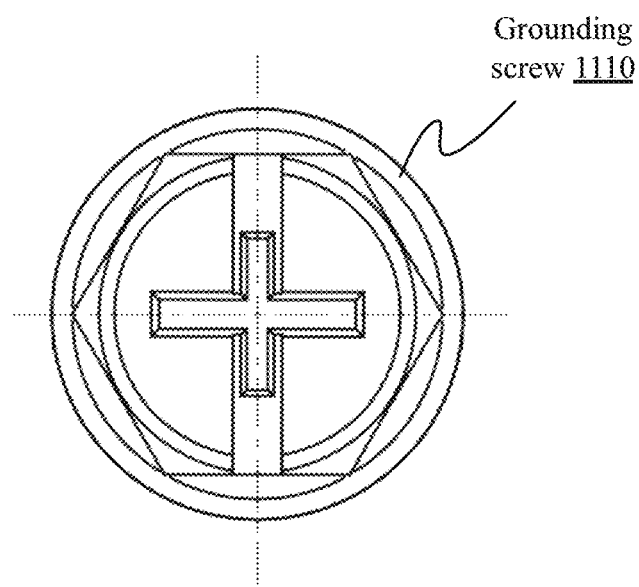

With the improved implementations of splices illustrated in FIGS. 2A-2E, installers need not drill additional holes, attach grounding straps, remove paint, or apply conductive pastes. Instead, the splice top and bottom may include holes (threaded, in some implementations) to accommodate self-drilling bonding or grounding screws 210. Screws 210 may comprise any type and form of self-drilling or self-tapping screw, and may be of an electrically conductive material (e.g. low carbon steel, zinc anodized or plated steel, etc.). Referring briefly ahead to FIGS. 11A and 11B, illustrated are a profile and end view of an implementation of a grounding screw 1110. As shown, a first portion of the screw body may comprise a cutting head or drill portion, and a second portion of the screw body may be threaded. Accordingly, an installer need not drill holes in the ladder racks for installation (although, in some implementations, an installer may drill pilot holes for self-tapping grounding screws or pilot holes may be pre-drilled by a manufacturer of the splice). As shown, in some implementations, the grounding screw may have a hexagonal head, and may include a standard slot drive, a cross slot drive (e.g. Phillips), or a combined cross and standard slot drive as shown. In some implementations, other driving types may be utilized, such as posidrive, Robertson, hex socket, Torq, etc.

In addition to providing an electrical connection between the ladder rack segment and the splice top or bottom, the grounding screw may also provide additional physical bonding, preventing joint separation at the splices.

Figure 3A:
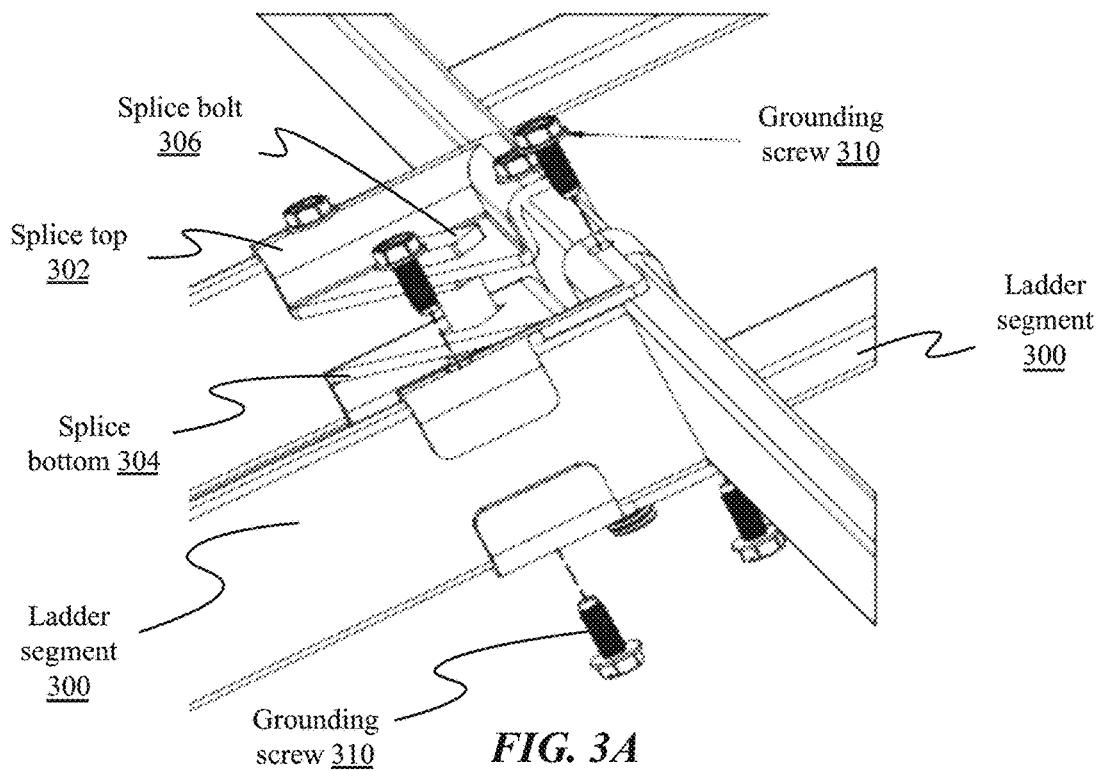
FIGS. 3A-3D are illustrations of an implementation of a conductive ladder rack junction splice.
Figure 3B:
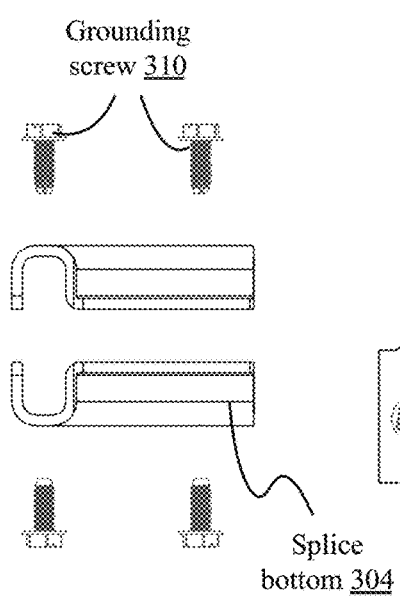
Figure 3C:
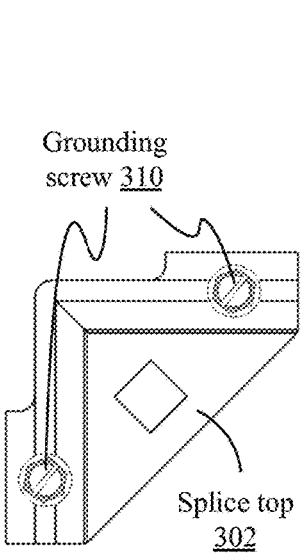
Figure 3D:
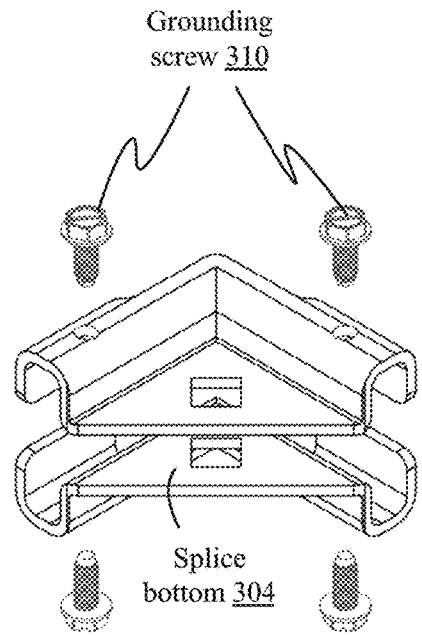

The same improved bonding method may be utilized with other configurations of splices. FIGS. 3A-3D are illustrations of an implementation of a conductive ladder rack junction splice for bonding a first ladder segment 300 at a right angle to a second ladder segment 300. As shown, the splices may have a similar rounded profile to those of the butt splices illustrated in FIGS. 2A-2E, but may include a right angle bend and an additional triangular portion for support and attachment of the splice bolt 306. As shown, in many implementations, the splice top 302 and splice bottom 304 may be identical. FIG. 3A shows the splice in position on two ladder racks; and FIGS. 3B-3D are end, top, and isometric views, respectively. As with the splices of FIGS. 2A-2E, implementations of the junction splices may include self-drilling grounding screws 310 and corresponding holes in the top and bottom splices.

FIGS. 4A-4D are illustrations of an implementation of a conductive ladder rack 90-degree splice. As noted above, such splices may be used when changing a plane of the ladder routing (e.g. vertical to horizontal or vice versa, such as for running cables down a stairwell). As shown, the splices may include a concave splice top 402 to cover an outer portion of the joint between ladder rack segments 400, and a convex splice bottom 404 to cover an inner portion of the joint. A splice bolt 406 may join the splice top and bottom and provide structural strength. The splices may include self-drilling grounding screws 410 and corresponding holes to provide electrical connections to the ladder segments 400. FIG. 4A shows the splice in position on ladder segments 400, and FIGS. 4B, 4C, and 4D are isometric, end, and side views, respectively.

Similarly, FIGS. 4E-4G are illustrations of an implementation of a conductive ladder rack 45-degree splice, in isometric, side, and end views. As with the 90-degree splice, implementations of a 45-degree splice may include a concave top portion 402 and convex bottom or inner portion 404, as well as a splice bolt 406 (not illustrated). Grounding screws 410 may be similarly utilized with the 45-degree splice.

Figure 5A:
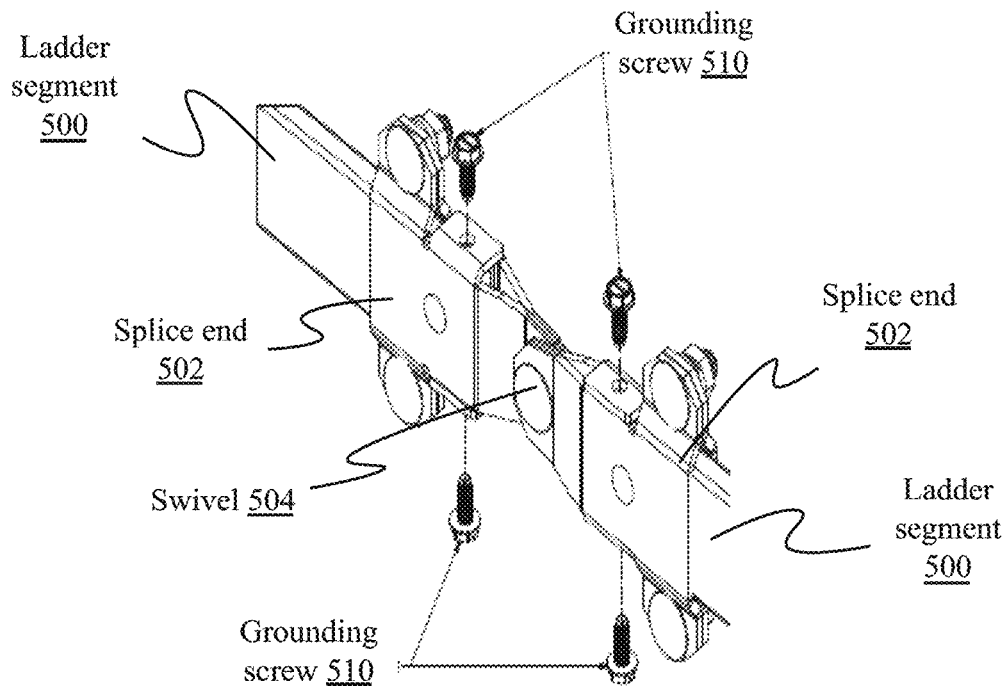
FIGS. 5A-5E are illustrations of an implementation of a conductive ladder rack adjustable butt swivel splice.
Figure 5B:
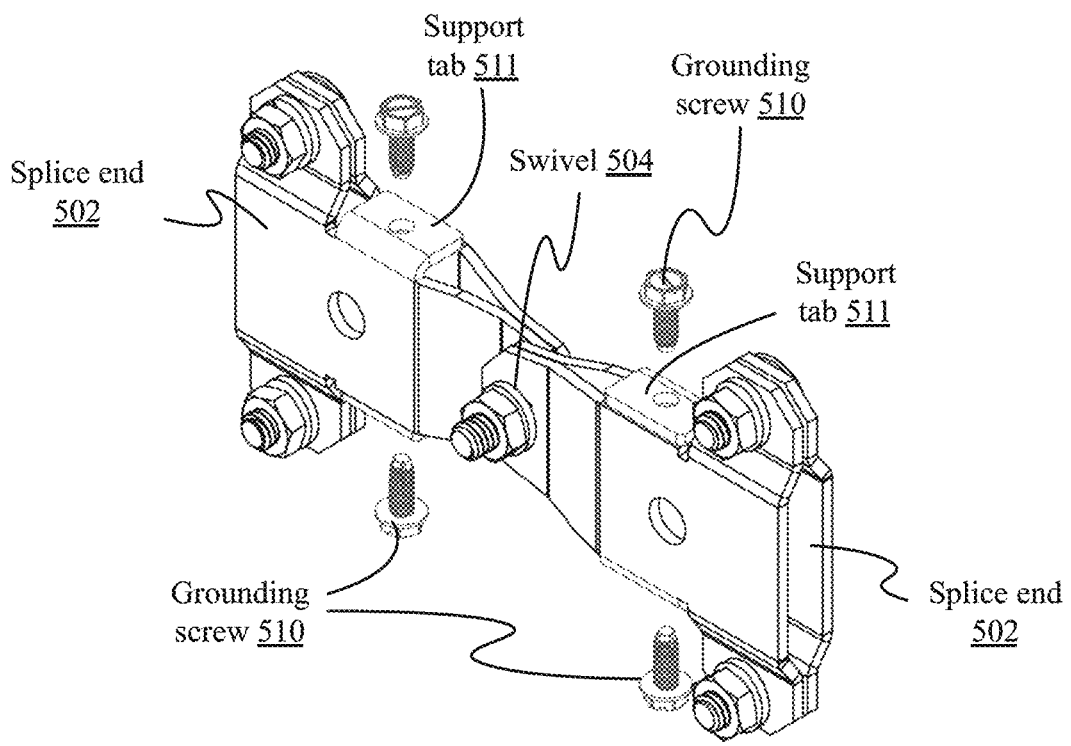
Figure 5C:
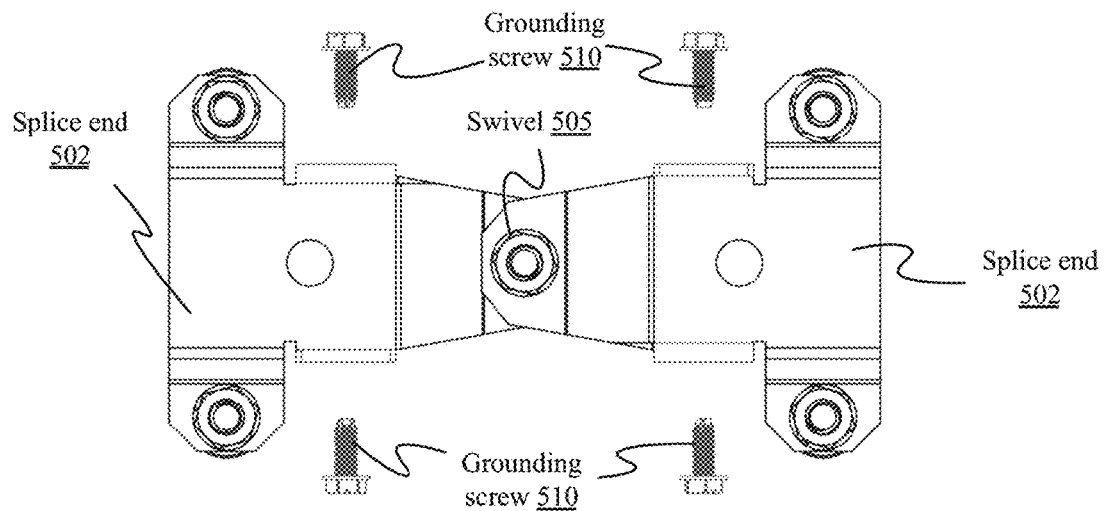
Figure 5D:
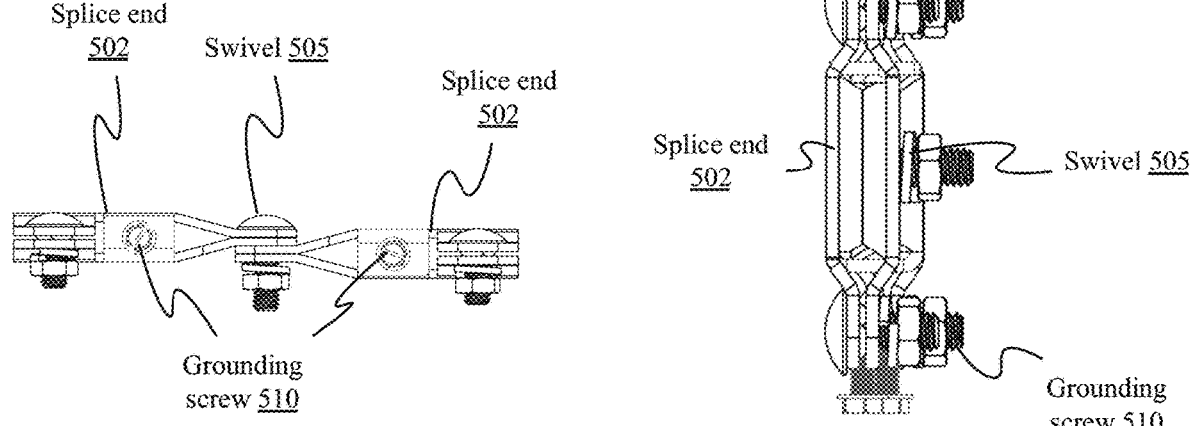
Figure 5E:
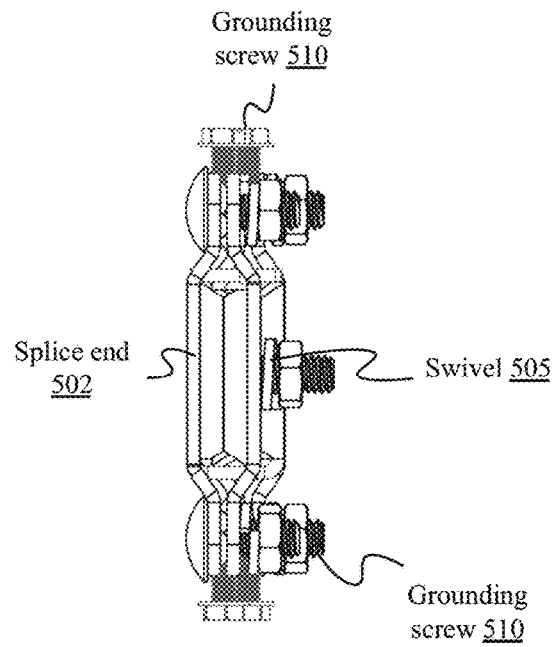
Figure 7A:
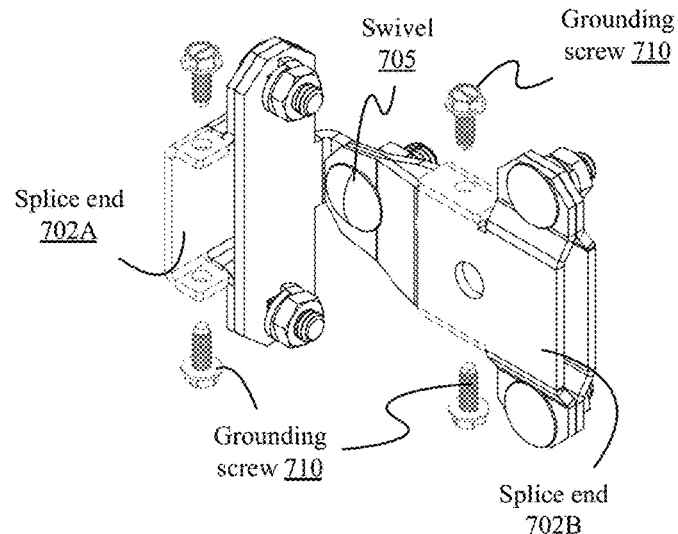
FIGS. 7A-7D are illustrations of another implementation of a conductive ladder rack adjustable junction swivel splice.
Figure 7B:
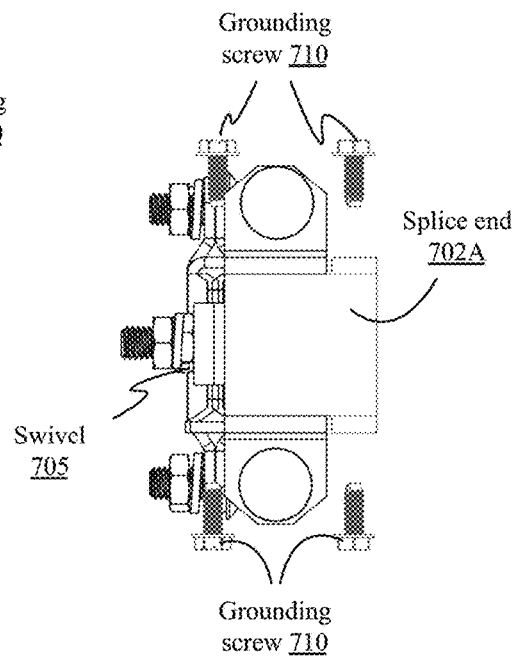
Figure 7C:
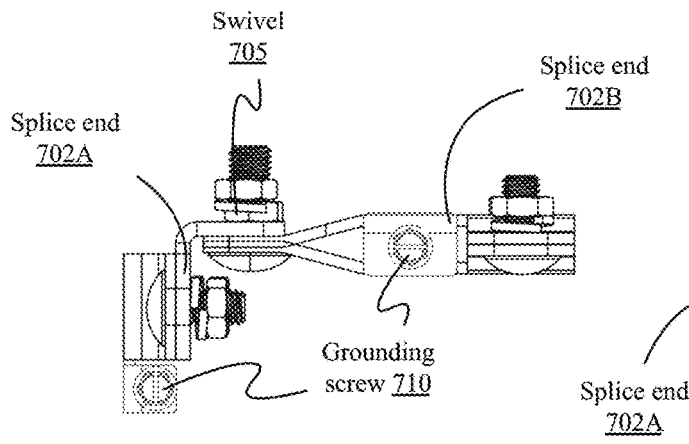
Figure 7D:
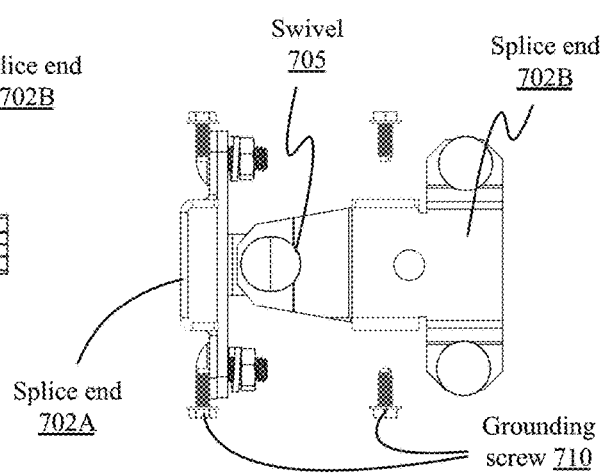
Figure 8A:
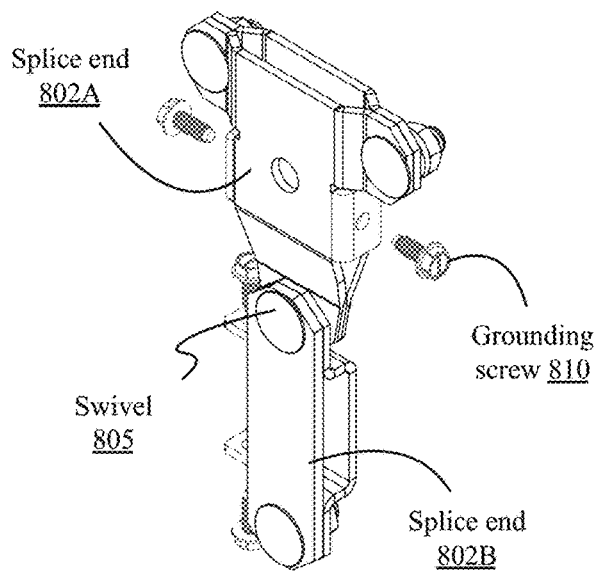
FIGS. 8A-8D are illustrations of an implementation of a conductive ladder rack adjustable vertical swivel splice.
Figure 8B:
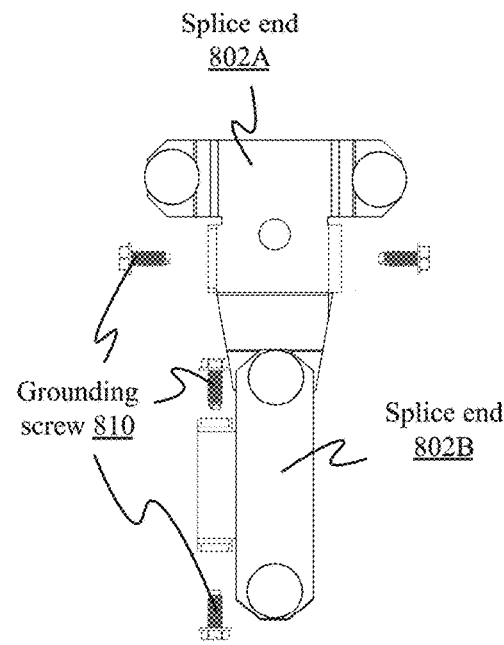
Figure 8C:
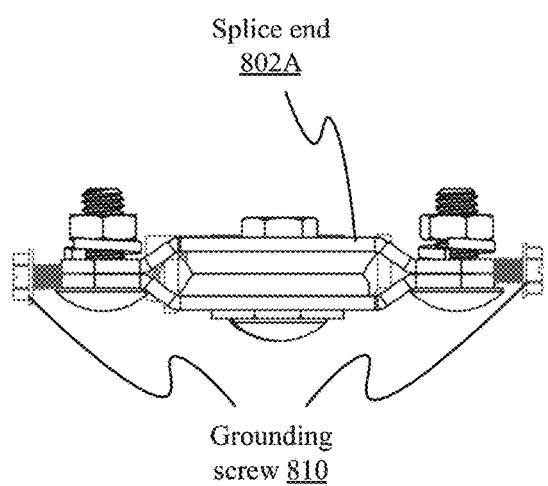
Figure 8D:
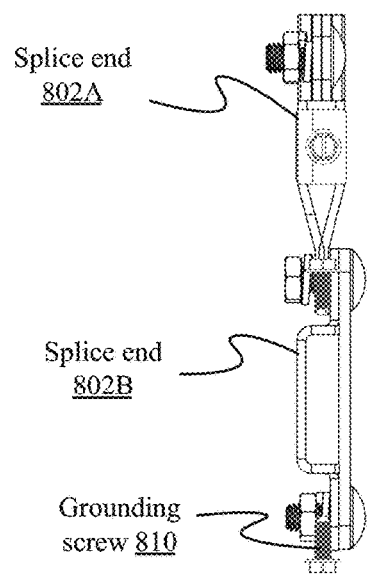

Other types of joints or junctions may be utilized with ladder racks, including joints that have an adjustable degree of freedom, allowing angles other than 45, 90, or 180 between ladder racks. FIGS. 5A-5E are illustrations of an implementation of a conductive ladder rack adjustable butt swivel splice. As shown in FIG. 5A, two ladder segments 500 may be joined at terminal portions via the adjustable butt swivel splice. Although shown in line, the segments may be rotated in the vertical plane, allowing adjustment of the angle between the segments (e.g. to 10 degrees, 15 degrees, 60 degrees, or any other such value). A swivel 504 may join splice ends 502 with one rotational degree of freedom, allowing the installer to rotate the ends into position. Swivel 504 may include a bolt, nut, and, in various implementations, a washer or lock washer. In various implementations, swivel 504 may be allowed to freely rotate with one degree of freedom, or may be rotated to the desired angle and then locked into position (e.g. by tightening the bolt and nut).

In some implementations, as illustrated, splice ends 502 may be identical, and may comprise two identical halves configured to be installed around a terminal portion of a ladder rack segment. As shown, the two halves may be bolted together to attach to the ladder segments. In the illustrated implementation, each half may include a support tab 511 comprising a threaded or unthreaded hole for a grounding screw 510. FIGS. 5B-5E show the splice in isometric, side, top, and end views, respectively.

Similarly, FIGS. 6A-6D are illustrations of an implementation of a conductive ladder rack adjustable junction swivel splice, with FIGS. 6B-6D showing side, isometric, and top views respectively. The junction swivel splice may allow a first ladder segment to join a segment ladder segment at an angle other than 90 degrees. As shown, a splice top 602 and splice bottom 604 may be joined by a swivel 605, which may comprise a bolt, washer, and nut as shown. The splice top and bottom may be identical, as shown, and each may comprise a first portion and second portion having complementary profiles (e.g. a left-hand portion and right-hand portion). Each said portion may include a first region having a profile corresponding to a ladder rack profile, and a second portion comprising a support and hole for swivel 605, such as a triangular support as shown. Swivel 605 may allow the left-hand and right-hand portions of the top and bottom splices to rotate with one degree of freedom (and, as noted above, may be allowed to rotate freely or may be locked into position by tightening the swivel bolt. Each portion of the top and bottom splices may include a hole for a self-drilling grounding screw 610 as shown.

FIGS. 7A-7D are illustrations of another implementation of a conductive ladder rack adjustable junction swivel splice that allows two ladder rack segments to be positioned at right angles, with a rotational degree of freedom along the axis of one segment. A first splice end 702A may include a support for a swivel bolt 705 having a bend, such as the 90 degree bend as shown. A second splice end 702B may be similar to splice ends 502 as discussed above. Splice end 702A and splice end 702B may include support tabs with holes for self-drilling grounding screws 710 as shown. FIGS. 7A-7D illustrate the swivel splice in isometric, end, top, and side views, respectively.

FIGS. 8A-8D are illustrations of an implementation of a conductive ladder rack adjustable vertical swivel splice in isometric, end, top, and side views, respectively. Similar to the splice of FIGS. 7A-7D, the vertical swivel splice may include a first splice end 802A which may be similar to splice ends 502. A second splice end 802 B may have a profile to attach to a first ladder rack segment such that splice end 802A is at an adjustable vertical angle relative to the first ladder rack segment. Swivel 805 may provide one rotational degree of freedom, as discussed above. Splice ends 802A-802B may include support tabs with holes for self-drilling grounding screws 810.

In some implementations, stronger splice connections between ladder racks may be required. Accordingly, some implementations may utilize heavy duty splices that provide stronger structural support. FIGS. 9A-9E are illustrations of an implementation of a conductive heavy duty butt splice for ladder racks. The butt splice may comprise two identical splice sides 902, each forming half of the splice and configured to surround the terminal portions of two adjacent ladder rack segments 900. The sides 902 may be joined by one or more splice bolts 906 as shown. In some implementations, the terminal portions of ladder rack segments may include holes for splice bolts 906, to prevent the segment from sliding out of the splice when in use. In other implementations, the bolts may be positioned just beyond the end of each ladder rack segment and not pass through the segment.

Figure 9A:
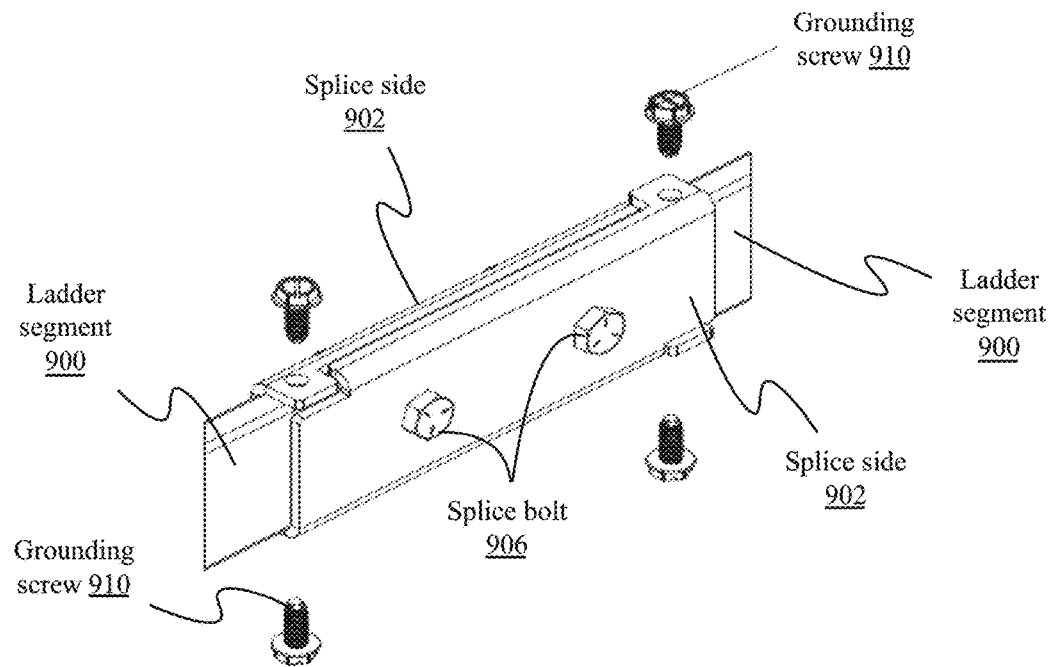
FIGS. 9A-9E are illustrations of an implementation of a conductive heavy duty butt splice for ladder racks.
Figure 9B:
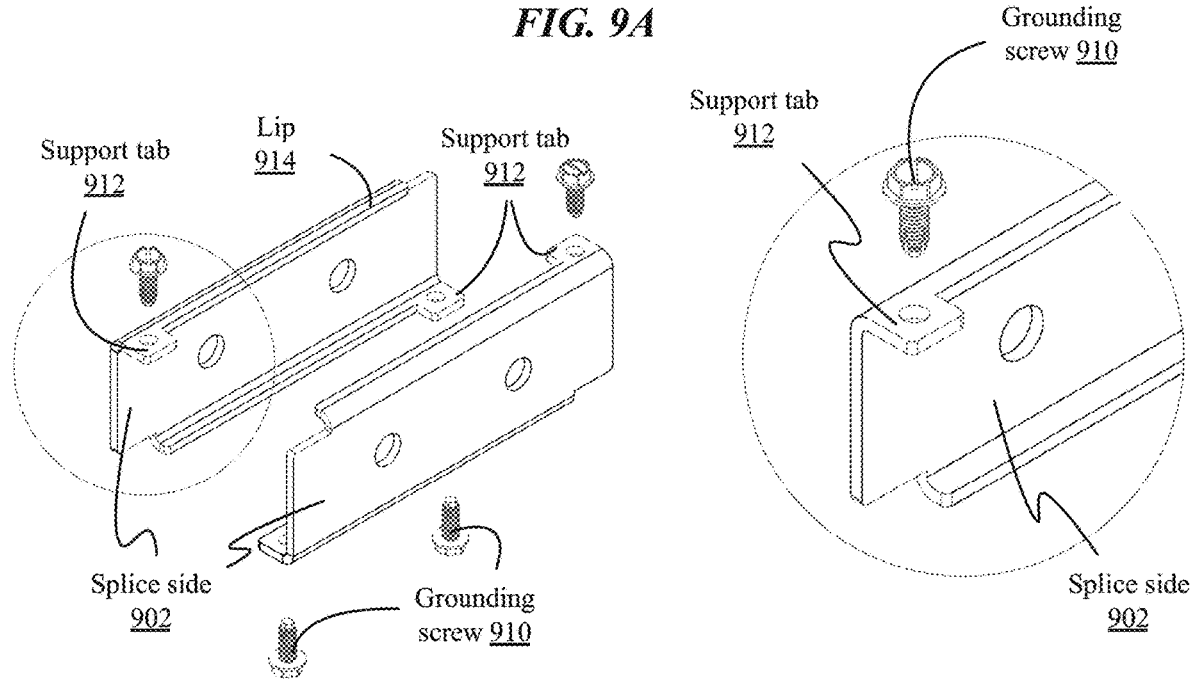
Figure 9C:
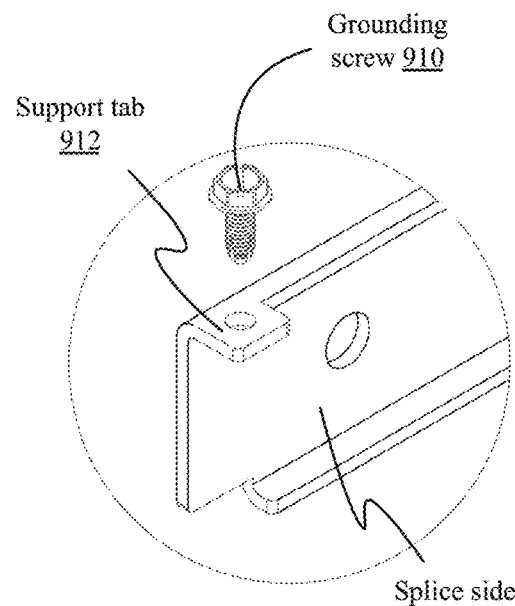
Figure 9D:
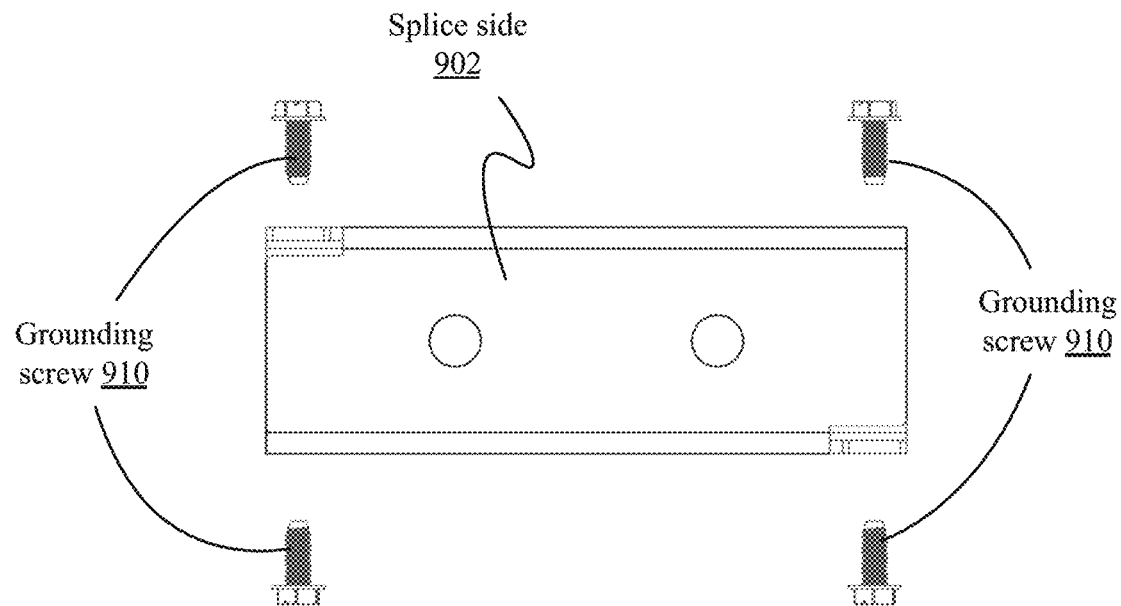
Figure 9E:
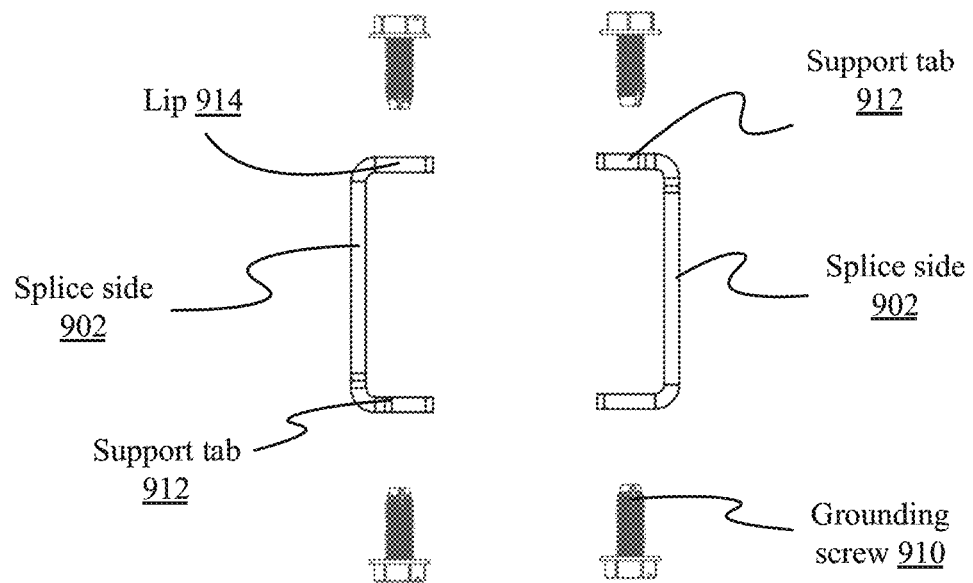

As shown in FIG. 9B, each splice side 902 may include a top and bottom lip 914 corresponding to the profile of the ladder rack. A portion of the lip may also include a support tab 912 as shown, comprising a threaded or unthreaded hole for a self-drilling grounding screw 910 as shown. FIG. 9C is an enlarged view of the circled portion in the isometric view of FIG. 9B. FIGS. 9D and 9E are side and end views of implementations of the heavy duty butt splice, respectively.

Similarly, FIGS. 10A-10D are illustrations of an implementation of a conductive heavy duty junction splice 1002 for ladder racks. The splice 1002 may comprise an L-shaped bracket having holes for splice bolts 1006 which may pass through corresponding holes on ladder rack segments 1000. Additionally, the splice 1002 may include threaded or unthreaded holes for self-drilling grounding screws 1010 as shown. FIGS. 10B-10D show implementations of the conductive heavy duty junction splice 1002 in isometric, side, and top views, respectively.

Accordingly, the splices discussed herein provide for easy, efficient installation to bond or join ladder rack segments, providing both structural support and an electrically conductive path to ground, without requiring additional drilling, removal of paint, addition of conductive pastes, or installation of grounding straps.

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

What is claimed:

1. A ladder rack splice, comprising:
   a first portion for attachment to a first ladder rack segment;
   a second portion for attachment to a second ladder rack segment, joined to the first portion;
   wherein each of the first portion and second portion include at least one screw hole; and
   a plurality of conductive screws comprising a cutting portion and a threaded portion, the conductive screws configured to join the first portion or second portion to the corresponding first or second ladder rack segment via a corresponding screw hole in the first portion or second portion of the ladder rack splice.

2. The ladder rack splice of claim 1, wherein the first portion and second portion are symmetrical.

3. The ladder rack splice of claim 1, wherein the first portion and second portion are portions of a unitary body.

4. The ladder rack splice of claim 3, wherein the first portion and second portion are arranged linearly along the unitary body.

5. The ladder rack splice of claim 1, wherein the first portion and second portion are joined by a swivel having one degree of freedom.

6. The ladder rack splice of claim 1, further comprising:
   at least one bolt hole within a corresponding at least one of the first portion, the second portion, and a third portion between the first portion and second portion; and
   a corresponding at least one bolt for affixing the ladder rack splice to a ladder rack segment.

7. The ladder rack splice of claim 6, wherein each of the first portion and second portion comprises at least one bolt hole.

8. The ladder rack splice of claim 1, wherein each of the first portion and second portion comprises a support tab; and
   wherein the screw hole in the first portion or second portion of the ladder rack splice is positioned within the corresponding support tab.

9. The ladder rack splice of claim 1, wherein each of the first portion and second portion comprise a conductive metal.

10. The ladder rack splice of claim 9, wherein each of the first portion and second portion comprise zinc anodized steel, painted steel, or aluminum.

11. A ladder rack splice system, comprising:
a first ladder rack splice comprising a plurality of screw holes;
a second ladder rack splice; and
a bolt configured to join the first ladder rack splice and second ladder rack splice around a first ladder rack segment and a second ladder rack segment;
wherein the first ladder rack splice comprises a plurality of conductive screws comprising a cutting portion and a threaded portion, each conductive screws configured to join the first ladder rack splice via a corresponding screw hole in the first ladder rack splice to one of the first ladder rack segment or the second ladder rack segment.

12. The ladder rack splice system of claim 11, wherein the first ladder rack splice and the second ladder rack splice are identical.

13. The ladder rack splice system of claim 11, wherein at least one of the first ladder rack splice and the second ladder rack splice comprises a swivel having one degree of freedom.

14. The ladder rack splice system of claim 11, wherein the first ladder rack comprises a splice end in a first plane and the second ladder rack comprises a splice end in a second plane orthogonal to the first plane.

15. The ladder rack splice system of claim 11, wherein the ladder rack splice system comprises one of a butt splice, a ninety-degree splice, a forty-five degree splice, a junction splice, an adjustable butt swivel splice, an adjustable junction swivel splice, or an adjustable vertical swivel splice.

16. The ladder rack splice of claim 11, wherein each of the first ladder rack splice and the second ladder rack splice comprise a conductive metal.

17. The ladder rack splice of claim 16, wherein each of the first ladder rack splice and the second ladder rack splice comprise zinc anodized steel, painted steel, or aluminum.

18. A method for installing a ladder rack splice, consisting essentially of:
positioning a ladder rack splice around a first ladder rack segment and a second ladder rack segment, the ladder rack splice comprising a first portion for attachment to the first ladder rack segment and a second portion for attachment to the second ladder rack segment; and
inserting a plurality of conductive screws through the ladder rack splice and each of the first ladder rack segment and the second ladder rack segment, each of the plurality of conductive screws comprising a cutting portion and a threaded portion, the conductive screws configured to join the first portion to the first ladder rack segment and the second portion to the second ladder rack segment.

19. The method of claim 18, wherein positioning the ladder rack splice around the first ladder rack segment and the second ladder rack segment further comprises positioning a splice top at a first position, positioning a splice bottom at a second position opposed to the first position across the ladder rack segments, and joining the splice top and splice bottom via a splice bolt.

20. The method of claim 18, further comprising setting an adjustable swivel of the ladder rack splice according to an angle formed by the first ladder rack segment and the second ladder rack segment.

* * * * *